US009419541B2

(12) United States Patent
Yoo

(10) Patent No.: US 9,419,541 B2
(45) Date of Patent: Aug. 16, 2016

(54) MULTILEVEL INVERTER

(71) Applicant: LSIS CO., LTD., Anyang-si, Gyeonggi-do (KR)

(72) Inventor: Anno Yoo, Seoul (KR)

(73) Assignee: LSIS CO., LTD., Anyang-si (KR)

(*) Notice: Subject to any disclaimer, the term of this patent is extended or adjusted under 35 U.S.C. 154(b) by 0 days.

(21) Appl. No.: 14/290,671

(22) Filed: May 29, 2014

(65) Prior Publication Data

US 2014/0362620 A1    Dec. 11, 2014

(30) Foreign Application Priority Data

Jun. 5, 2013    (KR) .................. 10-2013-0064391

(51) Int. Cl.
*H02M 5/45* (2006.01)
*H02M 7/5387* (2007.01)
*H02M 7/483* (2007.01)
*H02M 5/458* (2006.01)
*H02M 7/487* (2007.01)
(Continued)

(52) U.S. Cl.
CPC ............ *H02M 7/5387* (2013.01); *H02M 5/458* (2013.01); *H02M 7/483* (2013.01); *H02M 7/487* (2013.01); *H02M 7/49* (2013.01); *H02M 7/10* (2013.01)

(58) Field of Classification Search
CPC ..... H02M 7/487; H02M 7/49; H02M 7/5387; H02M 7/10; H02M 7/483; H02M 2007/4835; H02M 5/40; H02M 5/44; H02M 5/45; H02M 5/4505; H02M 5/458; H02M 5/4585
See application file for complete search history.

(56) References Cited

U.S. PATENT DOCUMENTS 3,745,440 A * 7/1973 Lord .................... H01F 27/385
363/17
5,625,545 A   4/1997 Hammond
(Continued)

FOREIGN PATENT DOCUMENTS

CN    101917133    12/2010
CN    201789430    4/2011
(Continued)

OTHER PUBLICATIONS

European Patent Office Application Serial No. 14170283.7, Search Report dated Mar. 4, 2015, 7 pages.
(Continued)

*Primary Examiner* — Timothy J Dole
*Assistant Examiner* — Shahzeb K Ahmad
(74) *Attorney, Agent, or Firm* — Lee, Hong, Degerman, Kang & Waimey PC; Jonathan Kang; Justin Lee

(57) ABSTRACT

A multilevel inverter having a configuration adequate to enhance efficiency while reducing conduction loss is disclosed, the multilevel inverter including a rectifier, a smoothing unit and an inverter unit, wherein the inverter unit includes a first switch unit interposed between the first node and a first output terminal, second switch units interposed between the second node and the first output terminal, a third switch unit interposed between the third node and the first output terminal, a fourth switch unit interposed between the first node and a second output terminal, fifth switch units interposed between the second node and the second output terminal and a sixth switch unit interposed between the third node and the second output terminal.

9 Claims, 16 Drawing Sheets

(51) Int. Cl.
*H02M 7/49* (2007.01)
*H02M 7/10* (2006.01)

(56) References Cited

U.S. PATENT DOCUMENTS

| | | | | |
|---|---|---|---|---|
| 6,930,899 B2* | 8/2005 | Bakran | ............... | H02M 7/487 363/132 |
| 7,219,673 B2* | 5/2007 | Lemak | ............... | H02M 7/487 363/132 |
| 8,811,048 B2* | 8/2014 | Zhang et al. | ............... | 363/37 |
| 2009/0003024 A1* | 1/2009 | Knaup | ............... | H02M 7/483 363/124 |
| 2009/0045782 A1 | 2/2009 | Datta et al. | | |
| 2009/0237962 A1* | 9/2009 | Yun | ............... | 363/37 |
| 2011/0116293 A1* | 5/2011 | Tabata et al. | ............... | 363/132 |
| 2012/0044730 A1* | 2/2012 | Paakkinen | ............... | H02M 7/487 363/131 |
| 2012/0057380 A1* | 3/2012 | Abe | ............... | H02M 7/487 363/62 |
| 2013/0107599 A1 | 5/2013 | Shekhawat et al. | | |
| 2013/0264876 A1* | 10/2013 | Paakkinen | ............... | 307/52 |
| 2013/0301314 A1* | 11/2013 | Fu | ............... | H02M 7/487 363/37 |
| 2014/0152109 A1* | 6/2014 | Kanakasabai | ............... | H02M 3/33584 307/66 |

FOREIGN PATENT DOCUMENTS

| | | |
|---|---|---|
| CN | 103036456 | 4/2013 |
| JP | 2000-184720 | 6/2000 |
| JP | 2001-045772 | 2/2001 |
| JP | 2002-247862 | 8/2002 |
| JP | 2006-320103 | 11/2006 |
| JP | 2007-221987 | 8/2007 |
| JP | 2013-078204 | 4/2013 |
| JP | 2014-128154 | 7/2014 |
| WO | 2011132206 | 10/2011 |
| WO | 2012/025978 | 3/2012 |

OTHER PUBLICATIONS

Japan Patent Office Application Serial No. 2014-116803, Office Action dated May 27, 2015, 3 pages.
The State Intellectual Property Office of the People's Republic of China Application No. 201410247158.9, Office Action dated Apr. 5, 2016, 7 pages.

* cited by examiner

MULTILEVEL INVERTER

CROSS-REFERENCE TO RELATED APPLICATIONS

Pursuant to 35 U.S.C. §119 (a), this application claims the benefit of earlier filing date and right of priority to Korean Patent Application No. 10-2013-0064391, filed on Jun. 5, 2013, the contents of which are hereby incorporated by reference herein in their entirety.

BACKGROUND OF THE DISCLOSURE

1. Field

The teachings in accordance with the exemplary embodiments of this present disclosure generally relate to an inverter, and more particularly to a multilevel medium voltage inverter.

2. Background

In general, a multilevel medium voltage inverter is an inverter having an input power whose rms (root mean square) value is over 600V for a line-to-line voltage, and has several stages in output phase voltage. The multilevel medium voltage inverter is generally used to drive an industrial load of large inertia ranging from several kW to several MW capacities of, for a non-limiting example, fans, pumps, compressors, tractions, hoists and conveyors.

One form of multilevel inverter is a Cascaded H-Bridge (CHB) inverter architecture, which employs multiple series-connected H-Bridge inverters for driving each motor winding phase, or a cascaded NPC (Neutral Point Clamped) inverter transformed from the CHB inverter. The recently used NPC inverter is advantageous over the conventional cascaded CHB inverter due to smaller size. The multilevel inverter widely used in various fields requires a higher efficiency and a topology of smaller number of elements.

SUMMARY OF THE DISCLOSURE

The present disclosure is to provide a multilevel inverter configured to have a structure capable of increasing efficiency by reducing a conduction loss.

In one general aspect of the present disclosure, there is provided a multilevel inverter, the multilevel inverter comprising:

a rectifier configured to provide a first rectifying voltage rectified by receiving a first phase voltage of 3-phases and a second rectifying voltage by receiving a second phase voltage of the 3-phases;

a smoothing unit configured to provide voltages of mutually different levels to mutually different first to third nodes by receiving the first and second rectifying voltages rectified by the rectifier; and an inverter unit formed with a plurality of switches for transmitting voltages of three levels provided by the smoothing unit, wherein the inverter unit includes a first switch unit interposed between the first node and a first output terminal, a second switch unit interposed between the second node and the first output terminal, a third switch unit interposed between the third node and the first output terminal, a fourth switch unit interposed between the first node and a second output terminal, a fifth switch unit interposed between the second node and the second output terminal and a sixth switch unit interposed between the third node and the second output terminal.

Preferably, but not necessarily, the first to sixth switch units may include a power semiconductor and a diode.

Preferably, but not necessarily, the second switch unit may include a first diode having a current directivity from the second node to the first output terminal, a first power semiconductor having a current flow directivity reverse from that of the first diode, a second diode having a current flow directivity reverse from that of the first diode and serially connected to the first diode, and a second power semiconductor having a current flow directivity reverse from that of the first power semiconductor and connecting one side to the other side of the second diode.

Preferably, but not necessarily, the first switch unit may include a first diode having a current flow directivity from the first output terminal to the first node, and a first power semiconductor having a current flow directivity reverse from that of the first diode and connecting one side to the other side of the first diode.

Preferably, but not necessarily, the third switch unit may include a second diode having a current flow directivity from the third node to the first output terminal, and a second power semiconductor having a current flow directivity reverse from that of the second diode and connecting one side to the other side of the second diode.

Preferably, but not necessarily, the fifth switch unit may include a first diode having a current directivity from the second node to the second output terminal, a first power semiconductor having a current flow directivity reverse from that of the first diode and connecting one side to the other side of the first diode, a second diode having a current flow directivity reverse from that of the first diode and serially connected to the first diode, and a second power semiconductor having a current flow directivity reverse from that of the first power semiconductor and connecting one side to the other side of the second diode.

Preferably, but not necessarily, the fourth switch unit may include a first diode having a current flow directivity from the second output terminal to the first node, and a first power semiconductor having a current flow directivity reverse from that of the first diode and connecting one side to the other side of the first diode.

Preferably, but not necessarily, the sixth switch unit may include a second diode having a current flow directivity from the third node to the second output terminal, and a second power semiconductor having a current flow directivity reverse from that of the second diode and connecting one side to the other side of the second diode.

Preferably, but not necessarily, the smoothing unit may include serially-connected first and second capacitors, wherein the first capacitor receives the first rectifying voltage from one side and the other side, and the second capacitor receives the second rectifying voltage from one side and the other side, and wherein one side node, a common node and the other side node of the first and second capacitors are respectively the first to third nodes.

Preferably, but not necessarily, the rectifier may include first and second diodes connecting one sides and the other sides of the first and second capacitors, and receiving a first phase voltage of the first phase voltage through a common node, third and fourth diodes connecting one sides and the other sides of the first and second capacitors and receiving a second phase voltage of the first phase voltage through a common node, and fifth and sixth diodes connecting one side and the other side of the first capacitor and receiving a third phase voltage of the first phase voltage through a common node; seventh and eighth diodes connecting one sides and the other sides of the second capacitor, and receiving a first phase voltage of a second phase voltage through a common node; ninth and tenth diodes connecting one sides and the other sides of the second capacitor, and receiving a second phase voltage of the second phase voltage through a common node; and eleventh and twelfth diodes connecting one sides and the other sides of the second capacitor, and receiving a third phase voltage of the second phase voltage through a common node.

Preferably, but not necessarily, the smoothing unit may include serially-connected first to four capacitors, wherein one side and the other side of the first and second capacitors are respectively the first node and the second node, the other side of the fourth capacitor is the third node, the first rectifying voltage is provided through one side and the other side of the first and second capacitors and the second rectifying voltage is provided through one side and the other side of the third and fourth capacitors.

Preferably, but not necessarily, the multilevel inverter may further comprise a phase shifting transformer including a plurality of unit power cells formed with the rectifier, the smoothing unit and the inverter unit, and provides a power signal having a predetermined phase to the unit power cells by receiving a 3-phase voltage.

ADVANTAGEOUS EFFECTS OF THE DISCLOSURE

The multi-level inverter according to the present disclosure thus described has an advantageous effect in that efficiency is enhanced while cost and size are reduced due to a reduced number of power semiconductor diodes and reduced conduction loss over a conventional serially-connected NPC inverter by using a new type of multilevel inverter.

DETAILED DESCRIPTION OF THE DISCLOSURE

The following embodiments described herein are intended to explain modes known of practicing the disclosure and to easily enable others skilled in the art to utilize the disclosure using the accompanied drawings.

Figure 1:
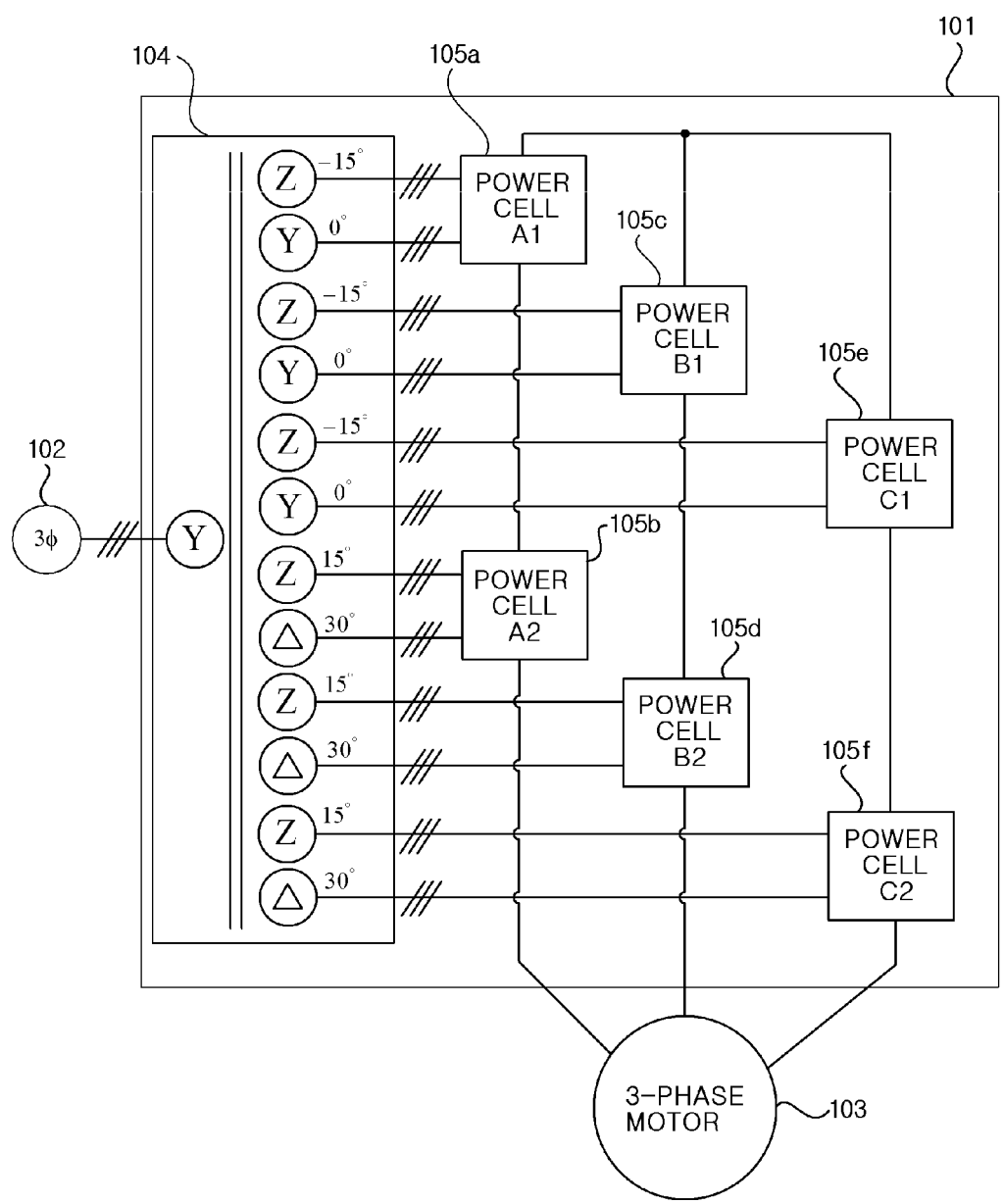
FIG. 1 is a block diagram illustrating a power conversion circuit including an inverter according to the present disclosure.

FIG. 1 is a block diagram illustrating a power conversion circuit including an inverter according to the present disclosure.

Referring to FIG. 1, a power conversion circuit (101) including a phase shift transformer and a multi-level medium voltage inverter includes an input 3-phase power (102) a 3-phase motor (103), a phase shift transformer (104) and unit power cells (105a~105f). The input 3-phase power (102) means an input power whose rms (root mean square) value is over 600V for a line-to-line voltage. The 3-phase motor (103) is a load of a power conversion circuit. A primary winding of the phase shift transformer (104) has a 3-phase wye winding shape, and a secondary winding has a total of 12 windings, each winding having a phase difference of −15°, 0°, 15° and 30° relative to the primary winding. That is, a structure of the secondary winding is determined by the number of power cells in the unit power cells (105a~105f).

Each output voltage of the unit power cells (105a~105f) is 5-level. The 3-phase motor (103) acting a load is formed with two unit power cells for each phase, and the number of unit power cells is extendible, if necessary. Outputs of the unit power cells (105a and 105b) are serially connected to output an 'a' phase voltage of the loaded 3-phase motor, and the unit power cells (105c and 105d) output a 'b' phase voltage, and the unit power cells (105e and 105f) output a 'c' phase voltage. The unit power cells (105a, 105c. 105e) are connected to outputs having phases of −15° and 0° among the outputs of the phase shift transformer (104), and the unit power cells (105b 105d. 105f) are connected to outputs having phases of 15° and 30° among the outputs of the phase shift transformer (104).

Figure 2:
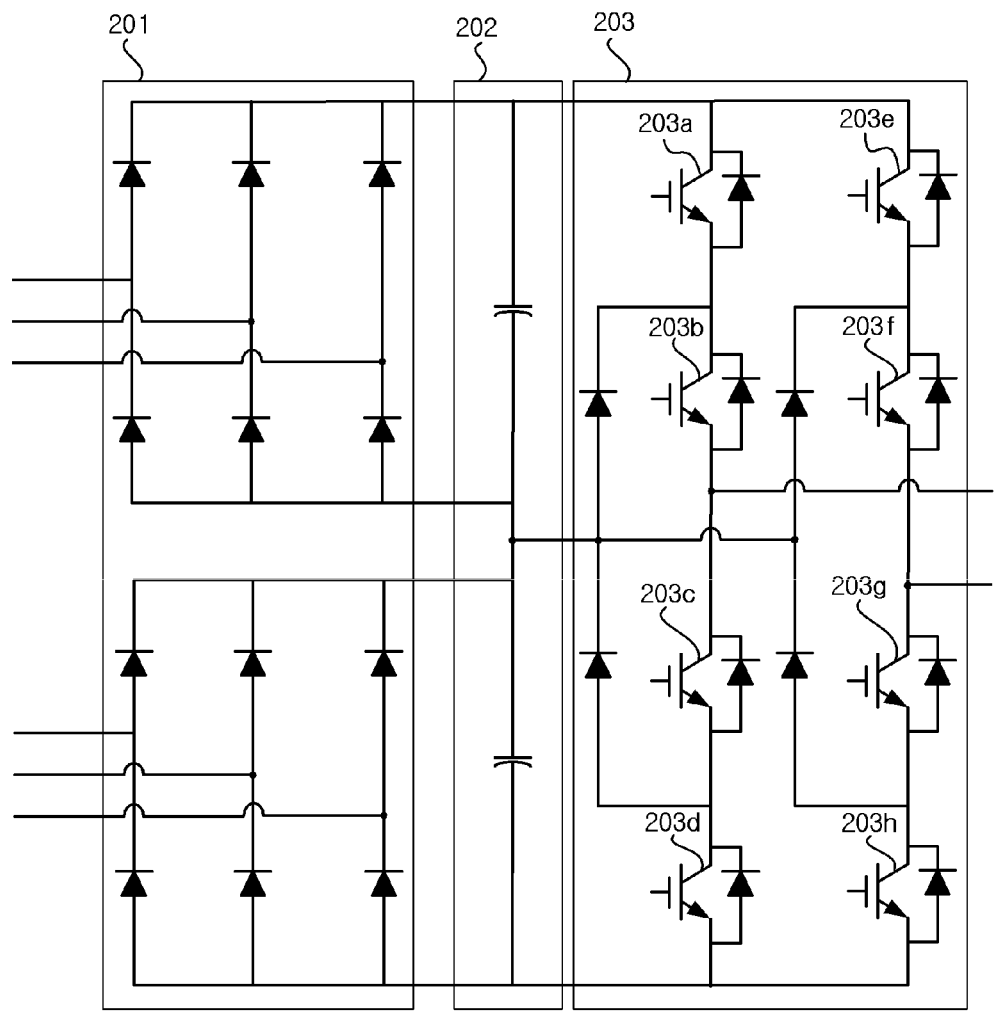
FIG. 2 is a circuit diagram illustrating a structure of each unit power cell illustrated in FIG. 1.

FIG. 2 is a circuit diagram illustrating a structure of each unit power cell illustrated in FIG. 1.

Referring to FIG. 2, a unit power cell includes a diode rectifier (201), a smoothing unit (202), and an inverter unit (203) configured to synthesize output voltages. The diode rectifier (201) receives two 3-phase powers, where an input power is an output voltage of the phase shift transformer (104) of FIG. 1. An output of the diode rectifier (201) is transmitted to two serially-connected DC-link capacitors, where each of the two DC link capacitors has a same capacitance. The inverter unit (203) is configured to synthesize the output voltages, where an outputted line-to-line voltage is 5 levels.

Figure 3:
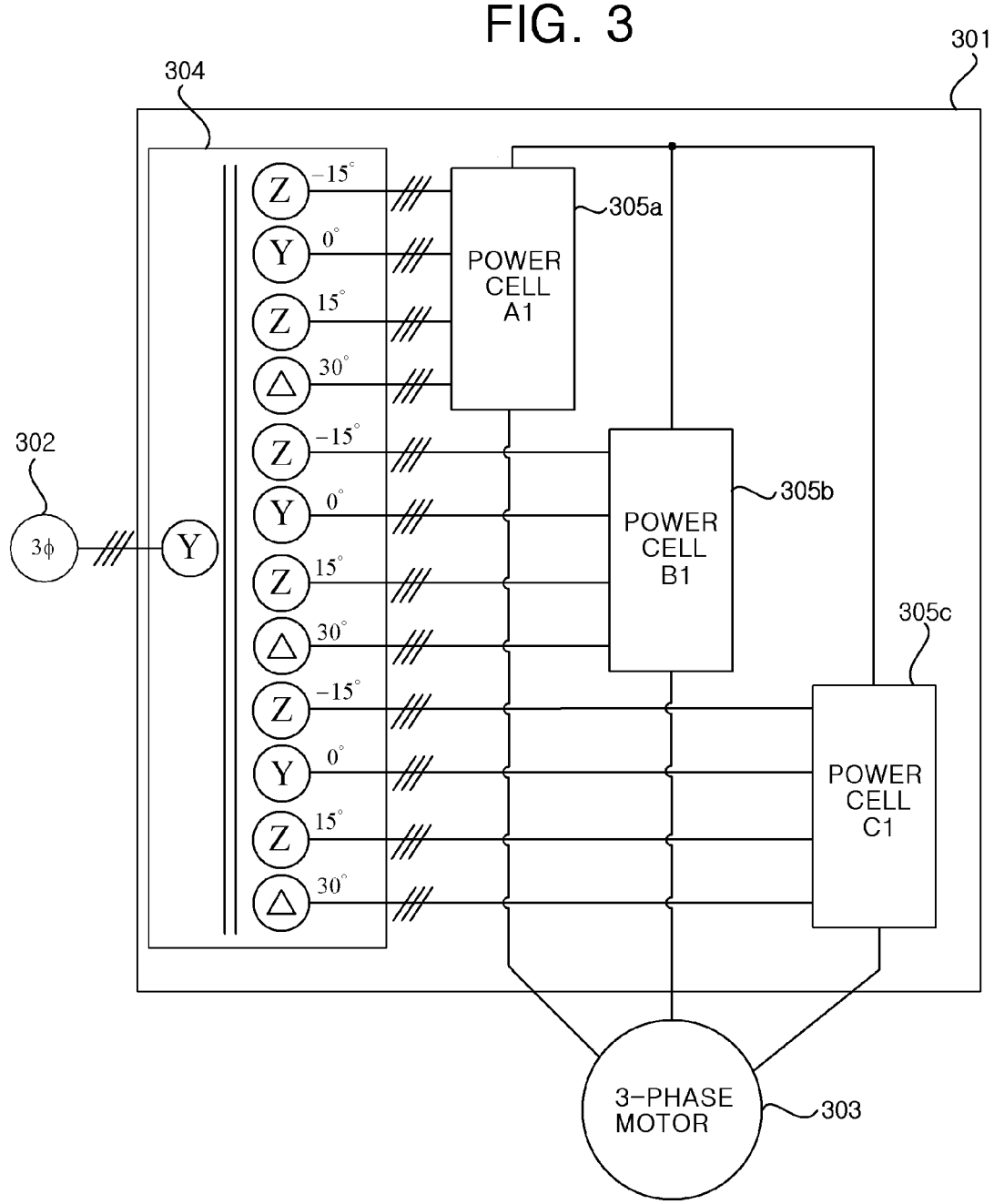
FIG. 3 is a block diagram illustrating a power conversion circuit including another inverter.

FIG. 3 is a block diagram illustrating a power conversion circuit including another inverter.

Referring to FIG. 3, a power conversion circuit (301) includes a input 3-phase power (302), a 3-phase motor (303), a phase shift transformer (304) and unit power cells (305a~305c). The input 3-phase power (302) means an input power whose rms (root mean square) value is over 600V for a line-to-line voltage. The 3-phase motor (303) is a load of the power conversion circuit. A primary winding of the phase shift transformer (304) has a 3-phase wye winding shape, and a secondary winding has a total of 12 windings, each winding having a phase difference of −15°, 0°, 15° and 30° relative to the primary winding. That is, a structure of the secondary winding is determined by the number of power cells in the unit power cells (305a~305c). The unit power cells (305a~305c) can synthesize an output voltage of 5-level. The unit power cell (305a) can output an 'a' phase voltage of the loaded 3-phase motor (303), the unit power cell (305b) can output a 'b' phase voltage, and the unit power cell (305c) can output a 'c' phase voltage.

Figure 4:
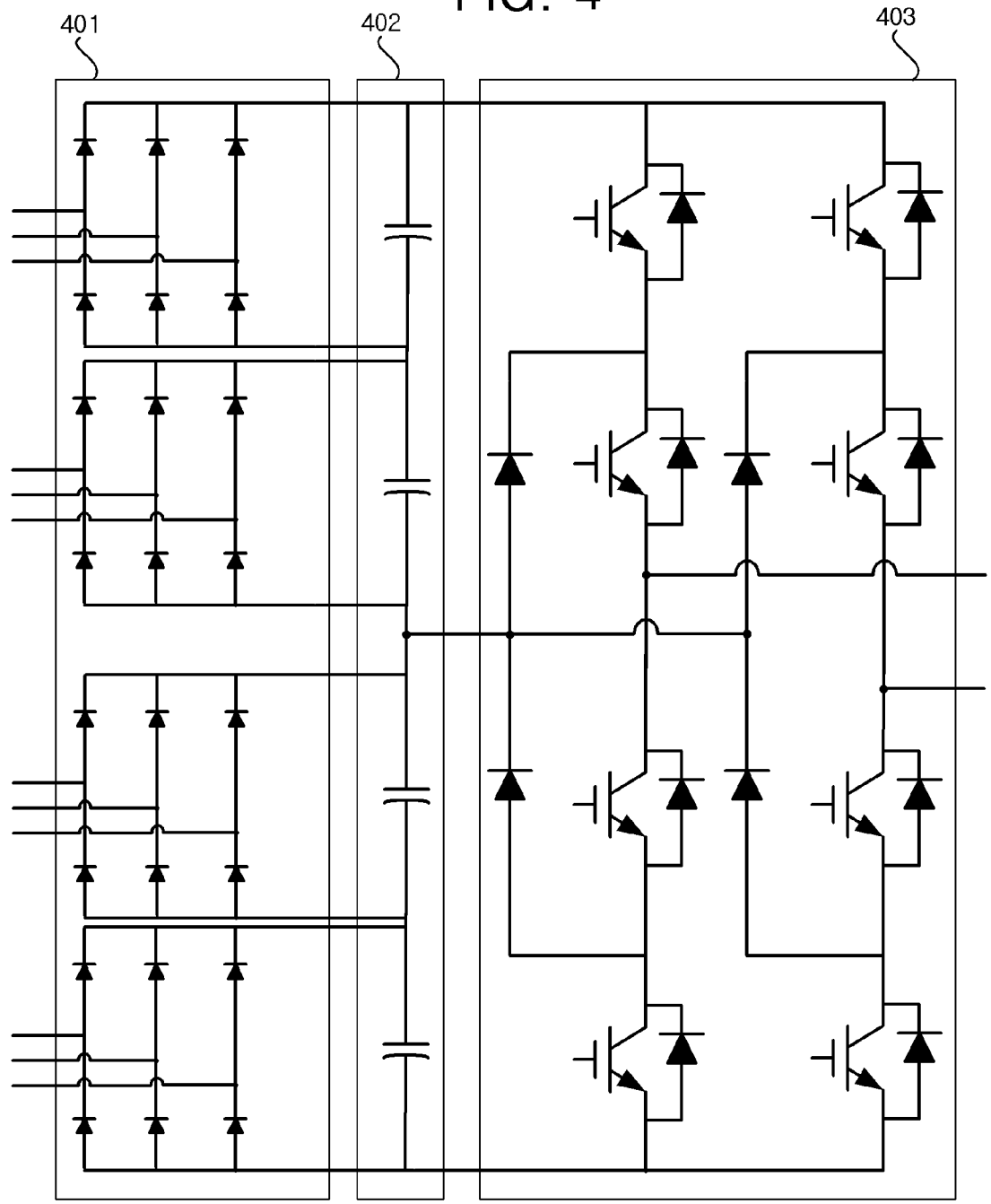
FIG. 4 is a block diagram illustrating a structure of each unit power cell illustrated in FIG. 2.

FIG. 4 is an inner circuit diagram illustrating a structure of each unit power cell illustrated in FIG. 3, the circuit including a diode rectifier (401), a capacitor (402) and an inverter unit (403) configured to synthesize output voltages. FIG. 4 illustrates four input terminal diode rectifiers (401), and an operation of the inverter unit (403) is substantially same as that of FIG. 2. However, a rated voltage value and a rated current value of power device used for a unit power cell may vary in response to a required output in the unit power cells in FIGS. 2 and 4. The output voltage of the unit power cell can show up to 5 levels.

FIGS. 5 to 10 are circuit diagrams illustrating an operation of an inverter unit illustrated in FIGS. 1 and 2. Successively, the operation of the inverter unit will be described with reference to FIGS. 1 to 11. Particularly, the description will be centered on the operation of the inverter unit illustrated in FIGS. 1 and 2.

One leg of the inverter unit (203) illustrated in FIG. 2 is such that four switch units (203a, 203b, 203c, 203d) are serially connected, and an output voltage is defined by the operation of the switch unit.

The operations of the switch units (203a, 203c) are complementary, and the operations of the switch units (203b, 203d) are also complementary. Thus, when it is assumed that the voltages of serially-connected capacitors (202) at DC terminal are respectively E, and when the switch units (203a, 203b) are turned on, the switch units (203c, 203d) become turned off, and a pole voltage that is outputted at this time becomes E. Furthermore, when the switch units (203a, 203c) are turned on, the switch units (203b, 203d) become turned off to make an outputted pole voltage zero. Likewise, when the switch units (203a, 203b) are turned off, the switch units (203c, 203d) become turned on to make an outputted pole voltage −E.

When the outputted pole voltage thus defined are used, a line-to-line voltage of each unit cell has 5 levels of 2E, E, 0, −E and −2E. As the line-to-line voltage of each unit cell is defined as 5 levels, a voltage synthesizable by the unit power cells (305a, 305b) of FIG. 3 now has 9-levels of 4E, 3E, 2E, E, 0, −E, −2E, −3E, −4E, and an output line-to-line voltage of load motor (303) may now have 17 levels of 8E, 7E, 6E, 5E, 4E, 3E, 2E, E, 0, −E, −2E, −3E, −4E, −5E, −6E, −7E, −8E.

The PWM method of multi-level medium voltage inverter may be classified to a Phase shifted PWM and a Level shifted PWM based on types of triangular carriers, and the multi-level inverter using the single phase NPC inverter according to the present invention is largely operated by the Level shifted PWM. Furthermore, the level shifted PWM is classified into an IPD (In-phase disposition), an APOD (Alternative phase opposite disposition) and a POD (Phase opposite disposition) based on phase of carrier wave, and the IPD (In-phase disposition) method is generally excellent in terms of harmonics of output voltage. Thus, the level shifted PWM of IPD method will be largely used in the present invention to describe the voltage synthesizing method of multilevel medium voltage inverter.

A conduction state of power semiconductor based on current direction may be illustrated as in FIGS. 5 to 10, when an output pole voltage is determined as E, 0, −E respectively.

Figure 5:
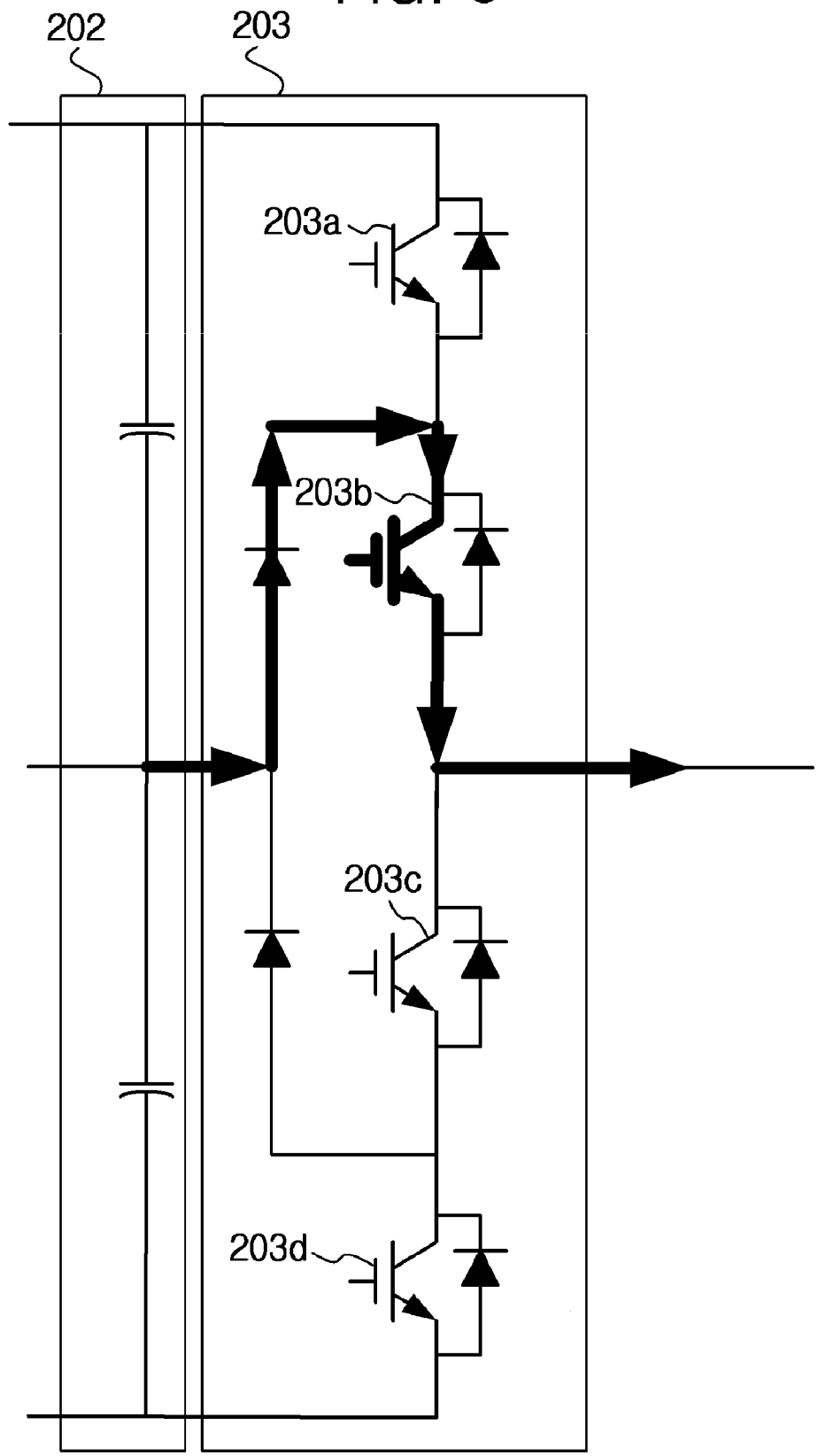
FIGS. 5 to 10 are circuit diagrams illustrating an operation of an inverter unit illustrated in FIGS. 1 and 2.
Figure 6:
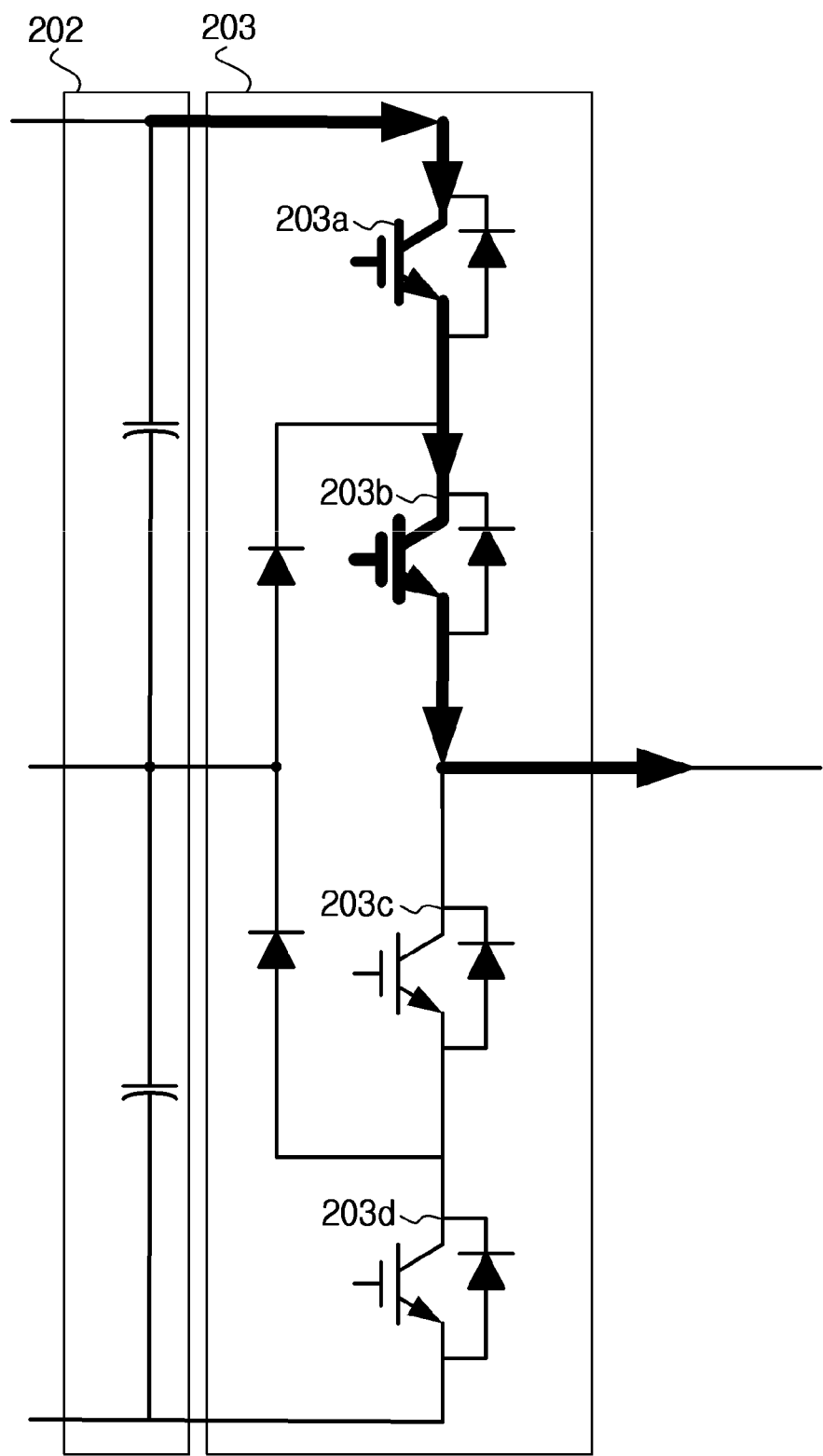
Figure 7:
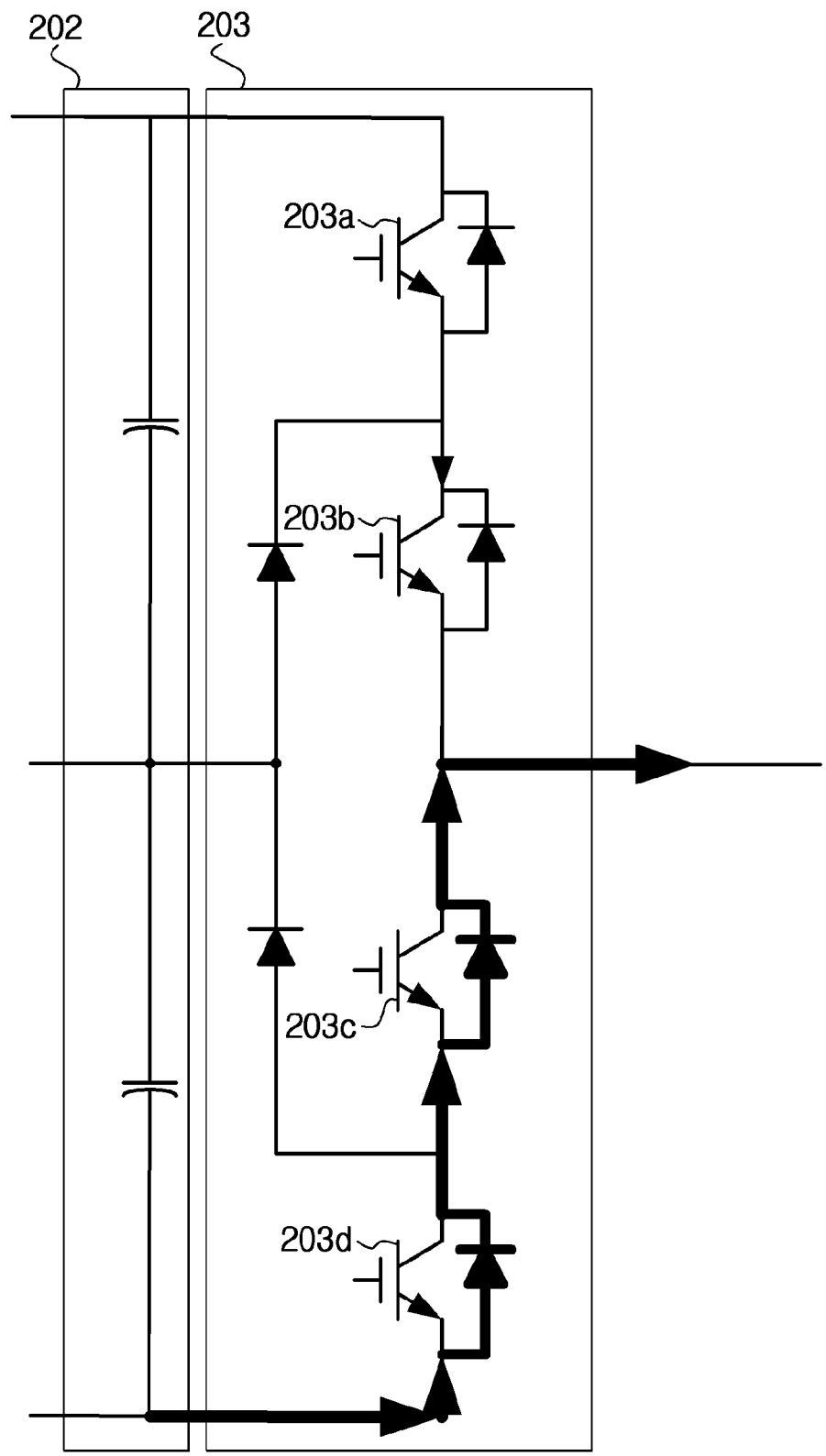

FIG. 5 illustrates a conduction state of a switch unit when an output pole voltage is 0, and an output current is positive, FIG. 6 illustrates a conduction state when an output pole voltage is E and an output current is positive, and FIG. 7 illustrates a conduction state when an output pole voltage is −E and an output current is positive. FIG. 5 illustrates a conduction state where a diode and a switch unit are conducted, FIG. 6 illustrates a conduction state where two switches are conducted, and FIG. 7 illustrates a conduction state where two diodes are conducted.

Figure 8:
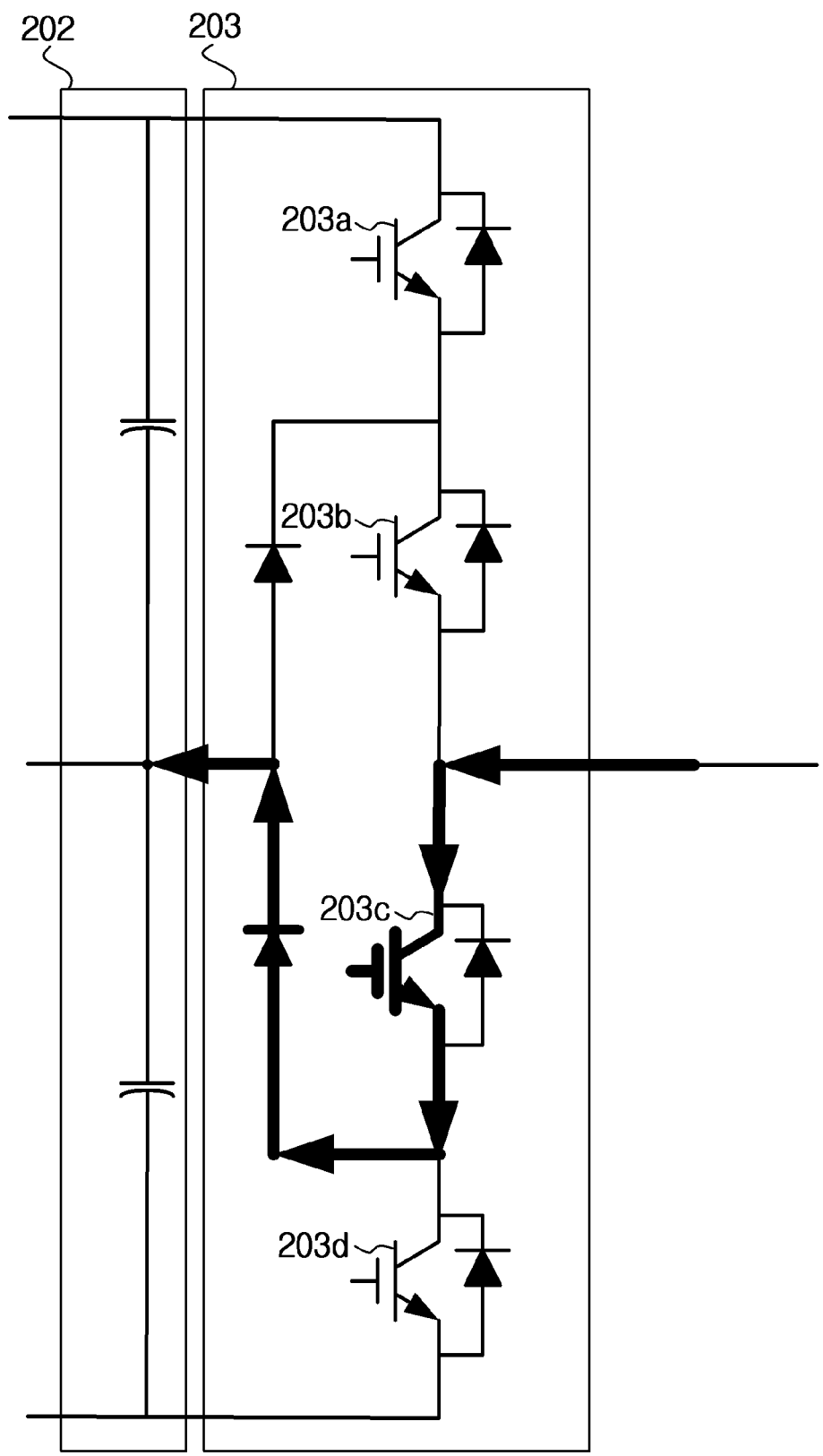
Figure 9:
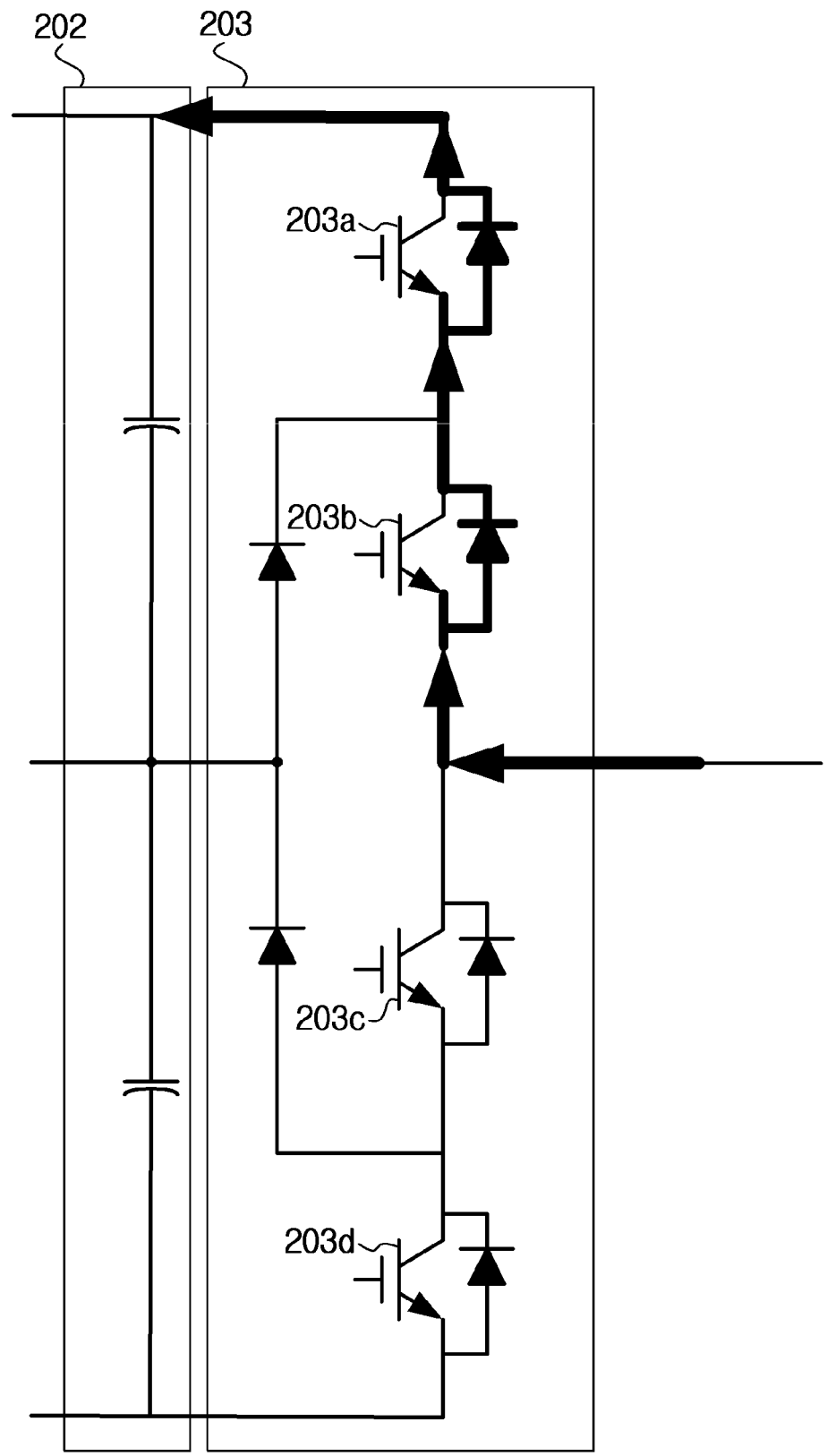
Figure 10:
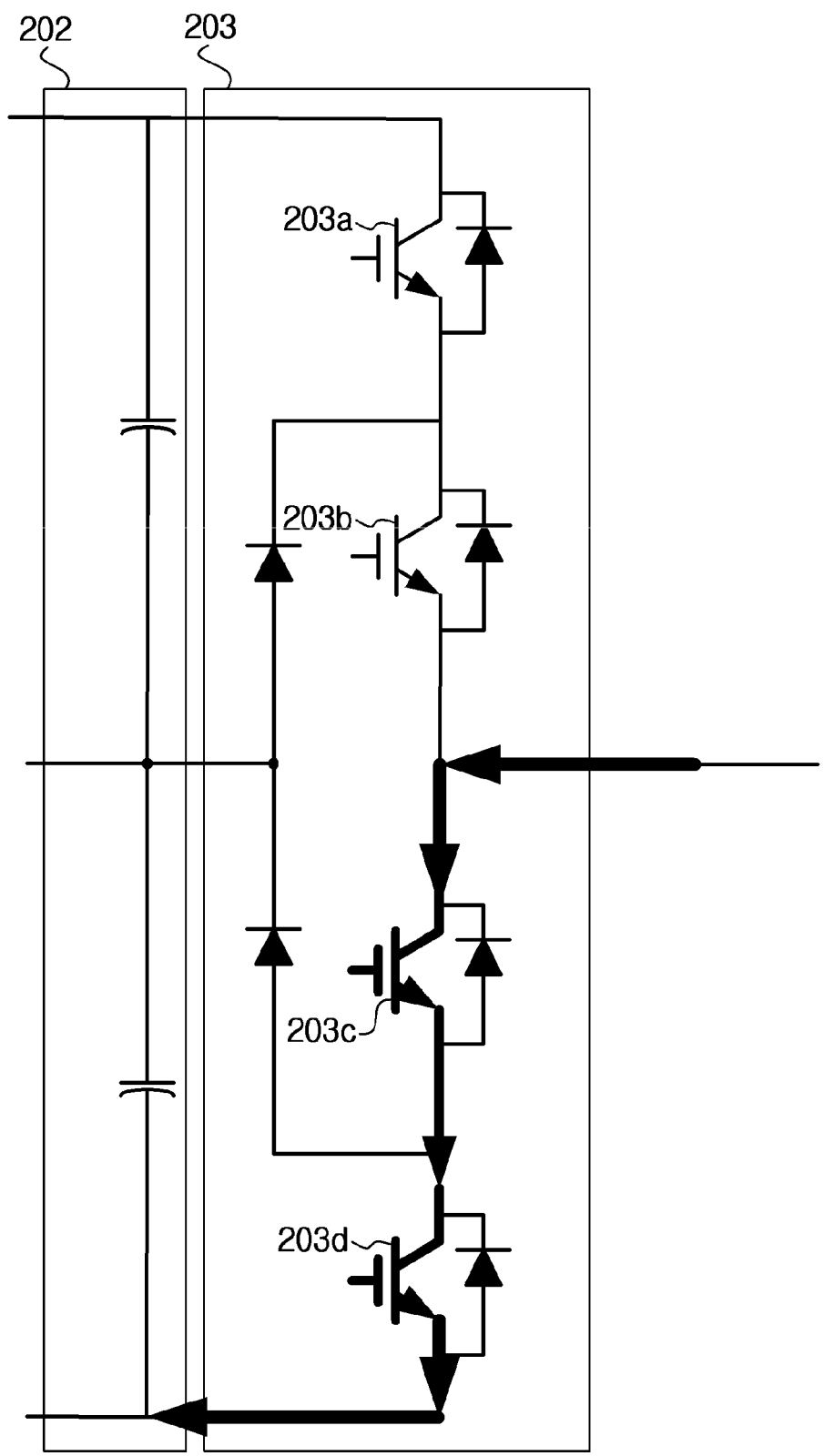

FIG. 8 illustrates a conduction state of a switch unit when an output pole voltage is 0, and an output current is negative, FIG. 9 illustrates a conduction state when an output pole voltage is E, and an output current is negative, and FIG. 10 illustrates a conduction state when an output pole voltage is −E, and an output current is negative. FIG. 8 illustrates a conduction state where a diode and a switch unit are conducted, FIG. 9 illustrates a conduction state where two diodes are conducted, and FIG. 10 illustrates a conduction state where two switch units are conducted.

As discussed in FIGS. 5 to 10, it can be ascertained that two power semiconductors are always conducted. The cascaded NPC (Neutral Point Clamped) inverter is advantageous over the conventional cascaded CHB inverter due to smaller size, but suffers disadvantages due to continuous conduction of two power semiconductors at all times in voltage synthesis resulting in difficulty in enhancing efficiency, and relatively increased size of heat dissipating device.

Thus, the present disclosure proposes a cascaded T-type NPC (Neutral Point Clamped) inverter configured to reduce the number of required power semiconductor devices and to reduce the conduction loss despite the same performance as that of the cascaded NPC inverter. The cascaded T-type NPC inverter according to the present disclosure can reduce the number of averagely conducted power semiconductor devices due to changed structure of inverter unit, and to reduce the conduction loss by easing a heat dissipating design, whereby the size and cost of the system can be reduced. The unit power cells proposed by the present disclosure may be applicable to the system in FIGS. 1 and 3.

Figure 11:
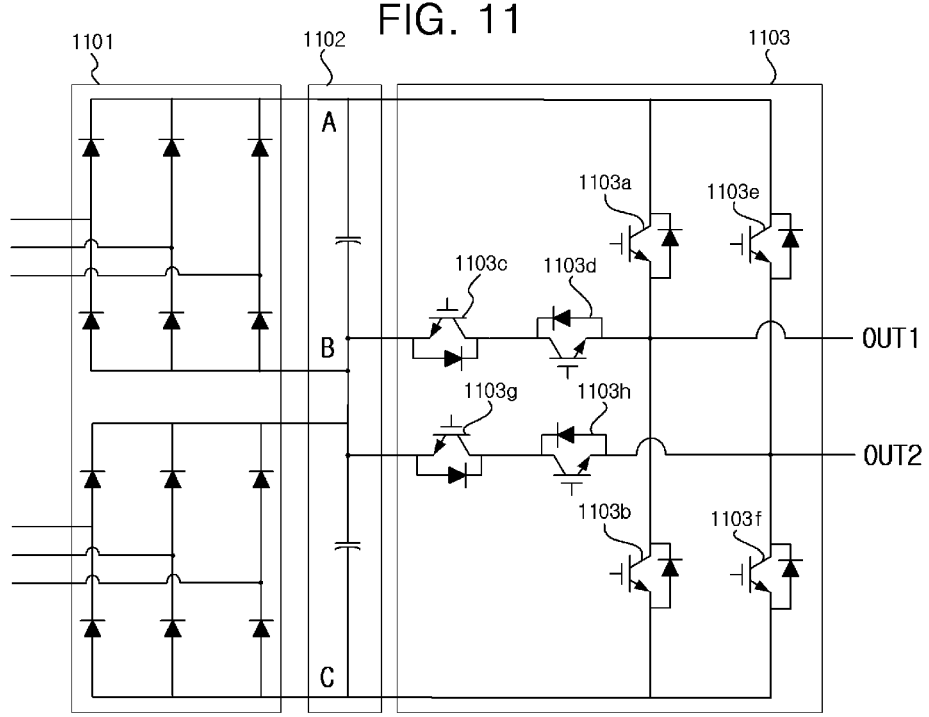
FIG. 11 is a circuit diagram illustrating a unit power cell according to a first exemplary embodiment of the present disclosure.

FIG. 11 is a circuit diagram illustrating a unit power cell according to a first exemplary embodiment of the present disclosure.

Referring to FIG. 11, a unit power cell includes a rectifier (1101), a smoothing unit (1102), and an inverter unit (1103). The rectifier (1101) serves to rectify a provided AC voltage. The smoothing unit (1102) functions to provide the voltage rectified by the rectifier (1101) to mutually different first to third nodes (A, B, C) in different levels of voltages by including capacitors. The inverter unit (1103) includes a plurality of switches (1103a~1103h) to transmit the three different levels of voltages provided by the smoothing unit (1102).

The inverter unit (1103) includes a first switch unit (1103a) interposed between the first node (A) and a first output end (OUT1), a second switch unit (1103c,1103d) interposed between the second node (B) and the first output end (OUT1), a third switch unit (1103b) interposed between the third node (C) and the first output end (OUT1), a fourth switch unit (1103e) interposed between the first node (A) and a second output end (OUT2), a fifth switch unit (1103g1103h) interposed between the second node (B) and the second output end (OUT2), and a sixth switch unit (1103f) interposed between the third node (C) and the second output end (OUT2). One switch unit is configured such that each current direction of diode and power semiconductor are reversely directed, where the power semiconductor may include an IGBT (Insulated Gate Bipolar Transistor) or a power MOSFET (Metal Oxide Silicon Field Effect Transistor).

The capacitor formed on the smoothing unit (1102) is connected to the rectifier (1101), and capacitors may be additionally formed in series and/or in parallel to an output end of the rectifier (1101). The inverter unit (1103) is a single T-type NPC inverter. The switch units (1103a, 1103b, 1103c, 1103d) may form a leg and the switch units (1103e, 1103f, 1103g, 1103h) may form another leg, whereby an output voltage can be synthesized using a potential difference between two legs.

Figure 12:
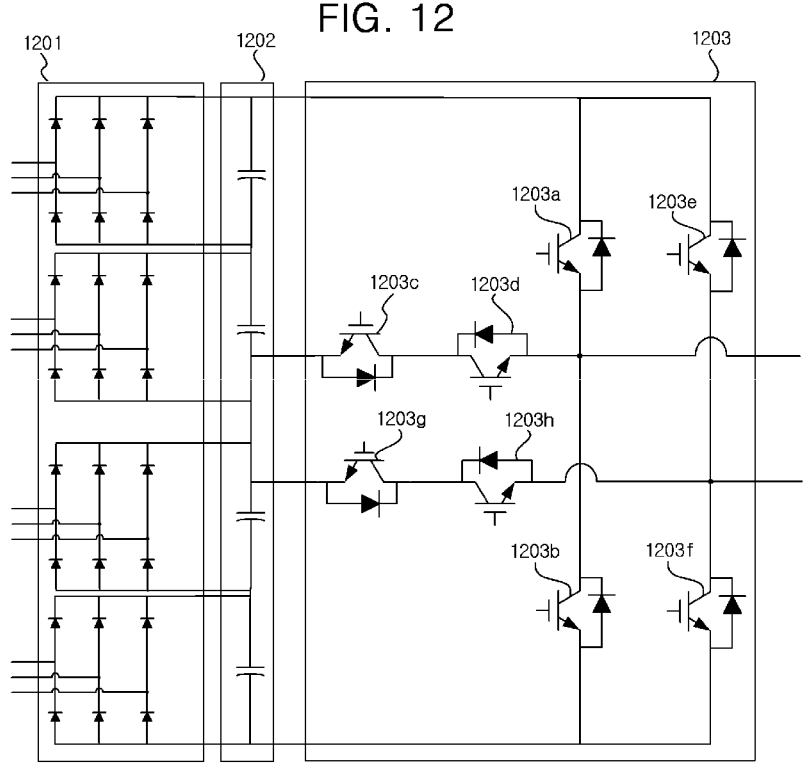
FIG. 12 is a circuit diagram illustrating a unit power cell according to a second exemplary embodiment of the present disclosure.

FIG. 12 is a circuit diagram of a unit power cell according to a second exemplary embodiment of the present disclosure.

Referring to FIG. 2, the power unit cell according to the second exemplary embodiment of the present disclosure includes a rectifier (1201), a smoothing unit (1202) and an inverter unit (1203), where the inverter unit (1203) of the unit power cell according to the second exemplary embodiment of the present disclosure is identical in configuration to that of the inverter unit of the unit power cell according to the first exemplary embodiment of the present disclosure, but the rectifier (1201) is different from the first exemplary embodiment in terms of configuration.

Although the cascaded T-type NPC inverter proposed by the exemplary embodiment of the present disclosure has the same operating principle as that of description in FIGS. 1 and 3, phase angles and the number of output ends in the phase shift transformer (104) of FIG. 1 and the phase shift transformer of FIG. 3 must be appropriately changed when configuration is made with more than three unit power cells for each phase of a motor.

Figure 13:
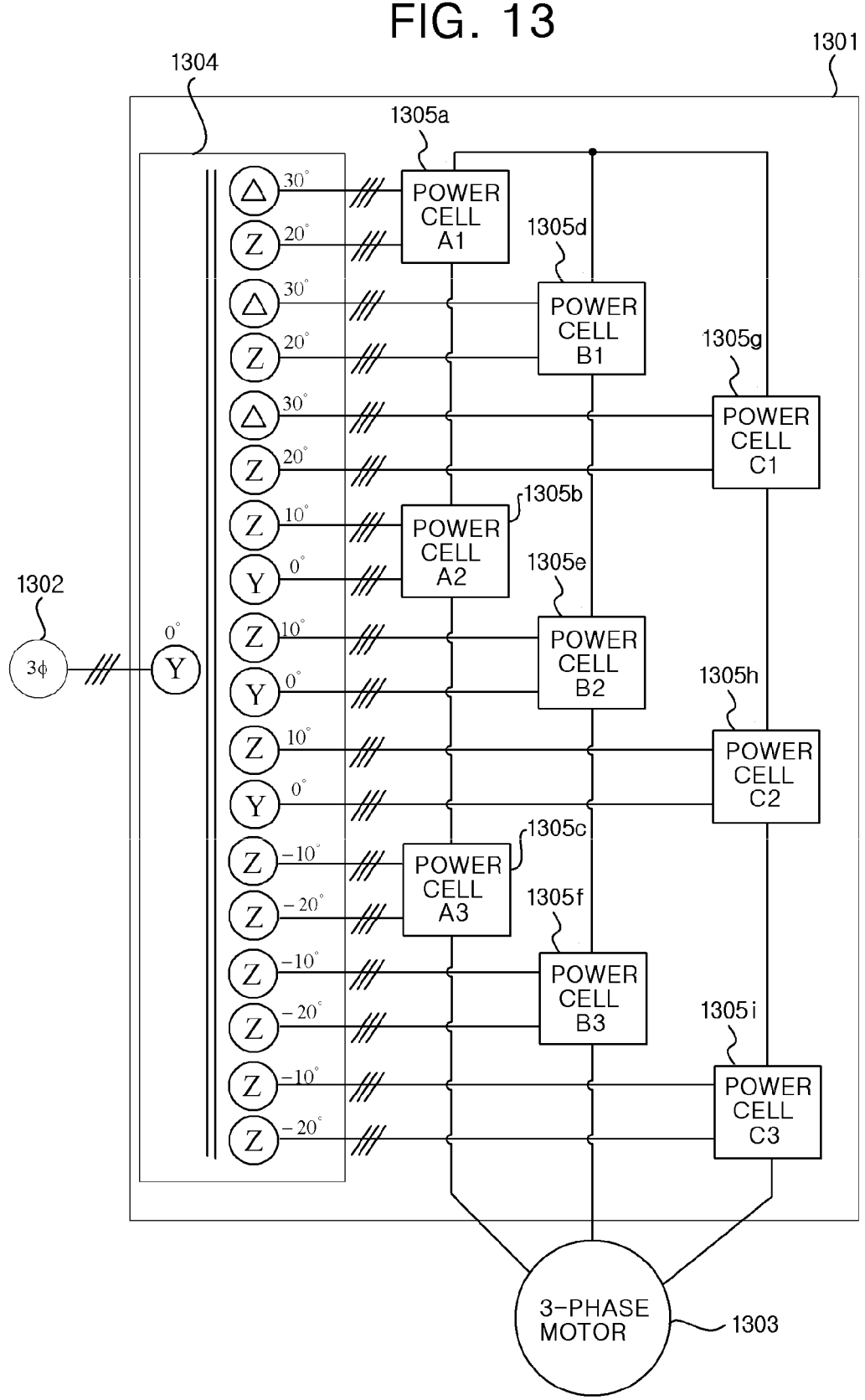
FIGS. 13 and 14 are block diagrams illustrating a power conversion circuit using three unit power cells and five unit power cells.
Figure 14:
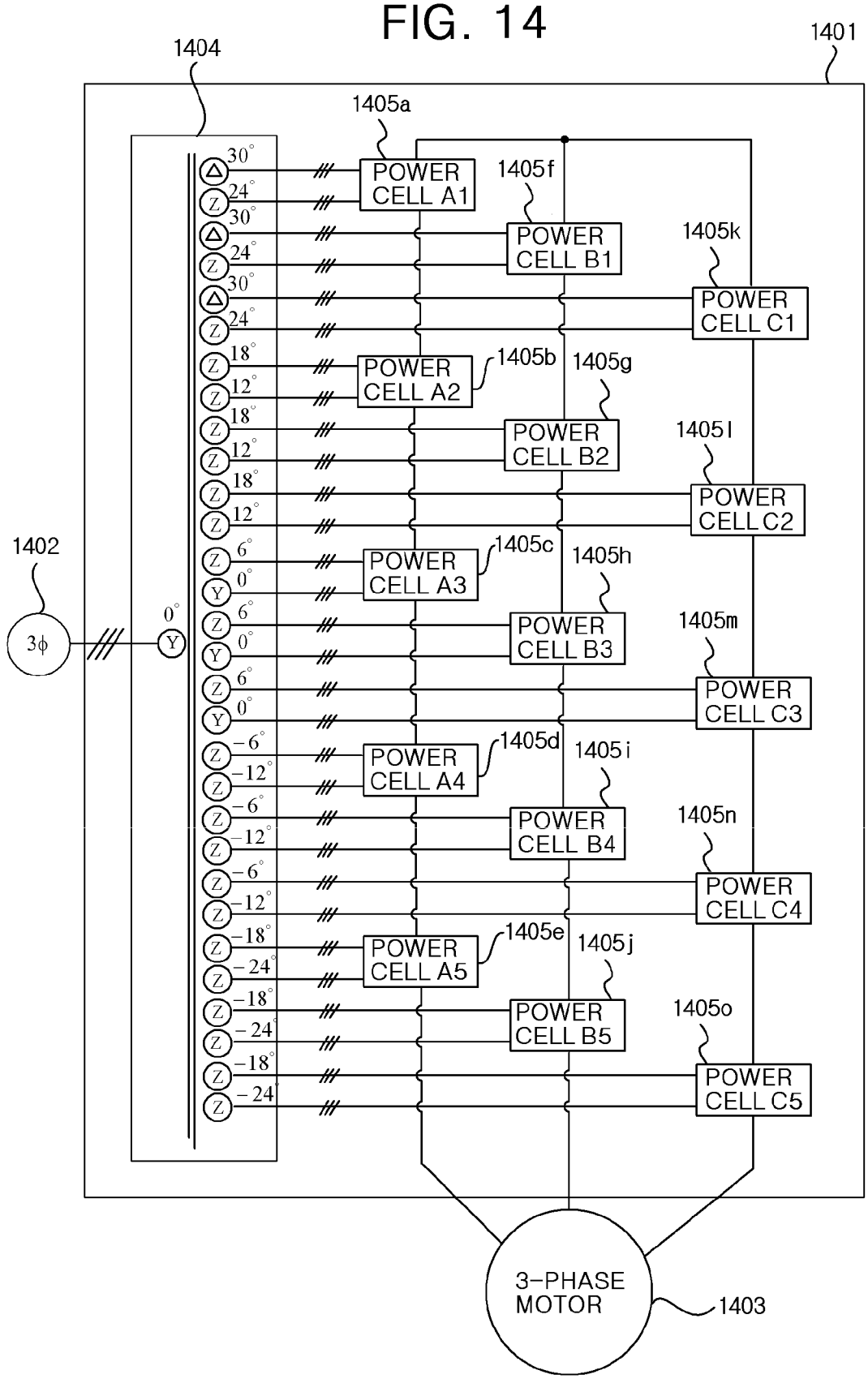

FIGS. 13 and 14 are block diagrams illustrating a power conversion circuit using three unit power cells and five unit power cells.

Referring to FIG. 13, the power conversion circuit may include a multilevel inverter (1301), a 3-phase voltage supplier (1302) and a 3-phase motor (1303). The 3-phase voltage supplier (1302) supplies a voltage having a root mean square value of an inputted line-to-line voltage ranging from 600 V or over. The 3-phase motor (1303) is a 3-phase motor which is a load of the power conversion circuit (1303). The multilevel inverter includes a power shift transformer (1304) and unit power cells (1305a~1305i). A phase angle of the power shift transformer (1304) may be changed in response to application methods. The unit power cells (1305a~1305i) can synthesize output voltages of 5 levels.

The unit power cells (1305a, 1305b, 1305c) output a 'a' phase voltage, and the unit power cells (1305d, 1305e, 1305f) output a 'b' phase voltage, and the unit power cells (1305g, 1305h, 1305i) output a 'c' phase voltage.

FIG. 14 illustrates a case where five unit power cells are designed for each phase of the motor using the unit power cell of FIG. 11.

The power conversion circuit may include a multilevel inverter (1401), a 3-phase voltage supplier (1402) and a 3-phase motor (1403). The multilevel inverter (1401) may include unit power cells (1405a~1405o) and a phase shift transformer (1404). The 3-phase voltage supplier (1402) supplies a voltage having a root mean square value of an inputted line-to-line voltage ranging from 600 V or over. The 3-phase motor (1403) is a 3-phase motor which is a load of the power conversion circuit (1403). A phase angle of the power shift transformer (1404) may be changed in response to application methods. The unit power cells (1405a~1405o) can synthesize output voltages of 5 levels.

The unit power cells (1405a, 1405b, 1405c, 1405d, 1405e) output a 'a' phase voltage, and the unit power cells (1405f, 1405g, 1405h, 1405i, 1405j) output a 'b' phase voltage, and the unit power cells (1405k, 1405l, 1405m, 1405n, 1405o) output a 'c' phase voltage. A system as illustrated in FIGS. 13 and 14 may be embodied using the unit power cells of FIG. 12.

FIGS. 15 to 20 are circuit diagrams illustrating an operation of an inverter unit illustrated in FIGS. 11 and 12. Successively, referring to FIGS. 11 to 20, an operation of the multilevel inverter according to the exemplary embodiment of the present disclosure will be described in detail.

As illustrated in FIGS. 11 and 12, the inverter unit according to exemplary embodiment of the present disclosure may be embodied by a single T-type NPC inverter.

A leg of the inverter unit of FIG. 11 includes four switch units (1103a, 1103b, 1103c, 1103d), where an output pole voltage is defined by its operation. The switch units (1103a and 1103c) cannot be turned on simultaneously, and the switch units (1103b and 1103d) cannot be turned on simultaneously, either. Furthermore, the operation of the switch units (1103a, 1103b) is such that when mutually independently required output pole voltage command is positive, the switch units (1103a, 1103c) operate, and the switch units (1103b, 1103d) operate when the output pole voltage command is negative.

When voltages across the capacitor serially connected to the smoothing unit are respectively defined as E, and an output pole voltage is positive, the switch unit (1103a) is turned on, and when the switch unit (1103c) is turned off, an output pole voltage of E is outputted, and when the switch unit (1103a) is turned off, and the switch unit (1103c) is turned on, an output pole voltage is zero. When an output pole voltage command is negative, the switch unit (1103b) is turned on, and when the switch unit (1103d) is turned on, an output pole voltage of −E is outputted, and when the switch unit (1103b) is turned off, and the switch unit (1103d) is turned on, an output pole voltage of zero is outputted.

When the output pole voltages thus described are used, output line-to-line voltages for each unit cell may have five levels of 2E, E, 0, −E, −2E. FIGS. 15 to 20 illustrate conduction of power semiconductors in response to the current directions when the output pole voltages are determined as E, 0, −E.

Figure 15:
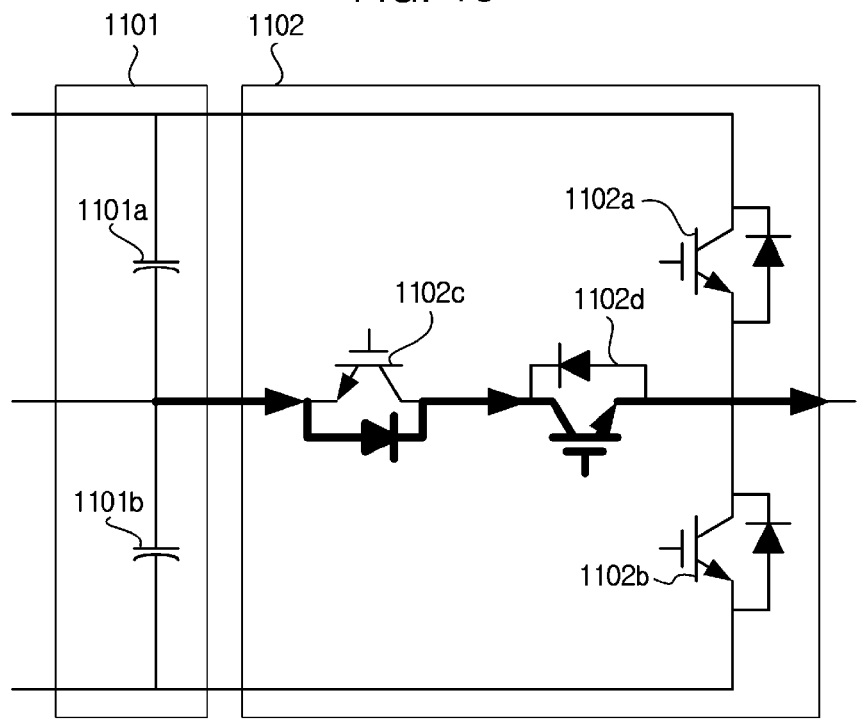
FIGS. 15 to 20 are circuit diagrams illustrating an operation of an inverter unit illustrated in FIGS. 11 and 12.
Figure 16:
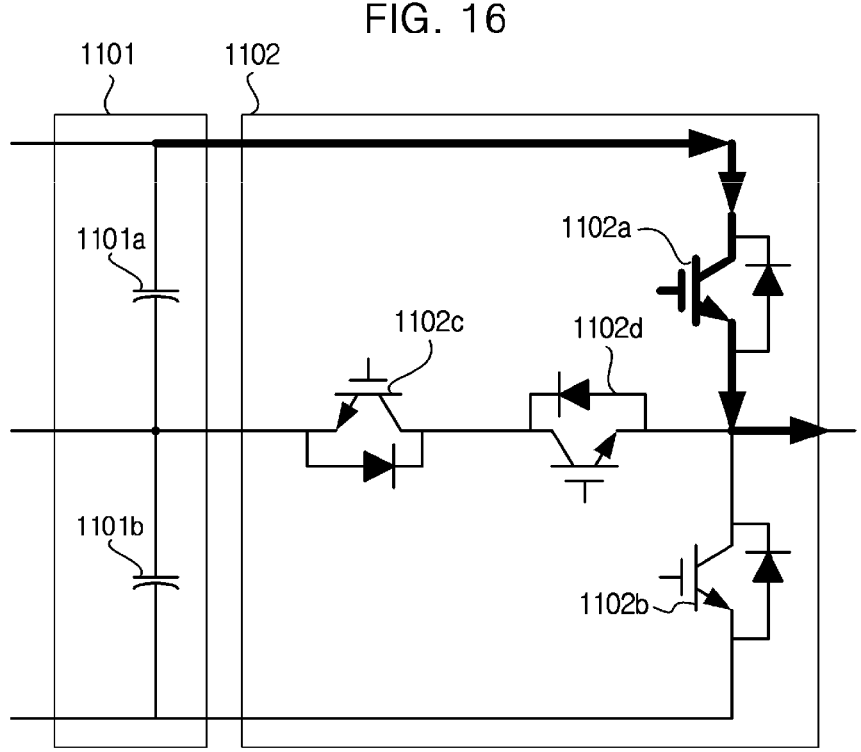
Figure 17:
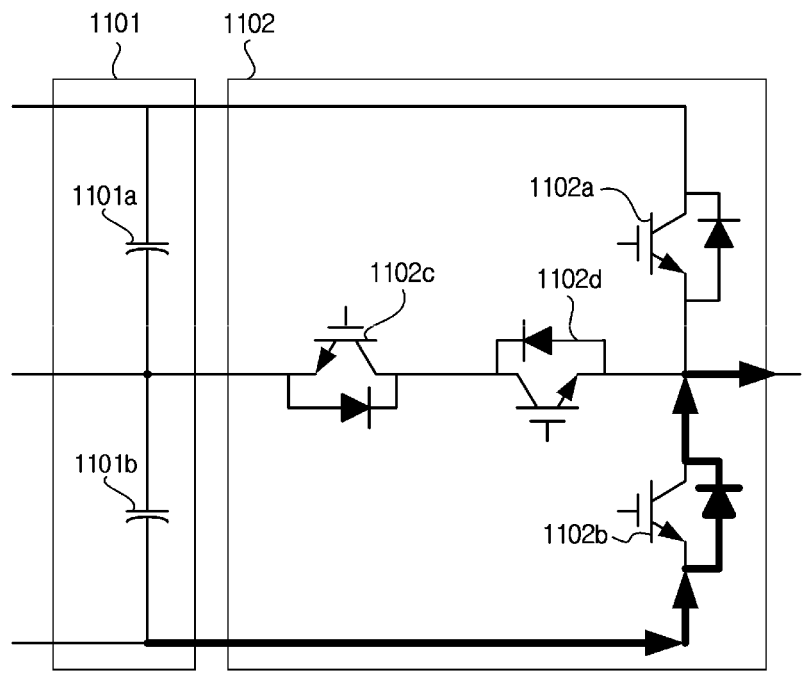

FIG. 15 illustrates a switch unit that is conductive when the output pole voltage is 0, and an output current is positive, FIG. 16 illustrates a switch unit that is conductive when the output pole voltage is E, and an output current is positive, and FIG. 17 illustrates a switch unit that is conductive when the output pole voltage is −E, and an output current is positive. One diode and one switch unit are conductive in FIG. 15, one switch unit is conductive in FIG. 16 and one diode is conductive in FIG. 17.

Figure 18:
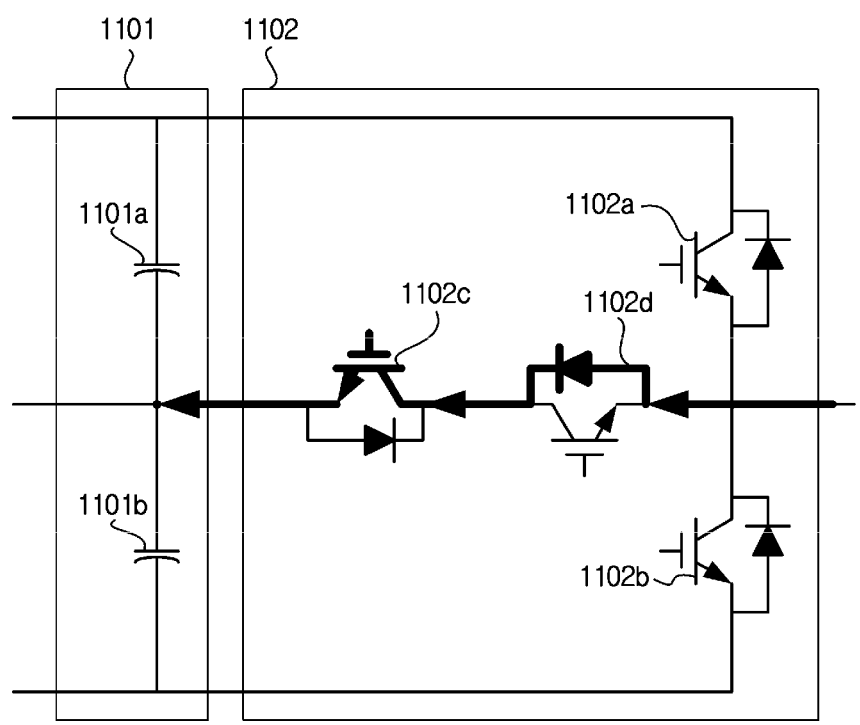
Figure 19:
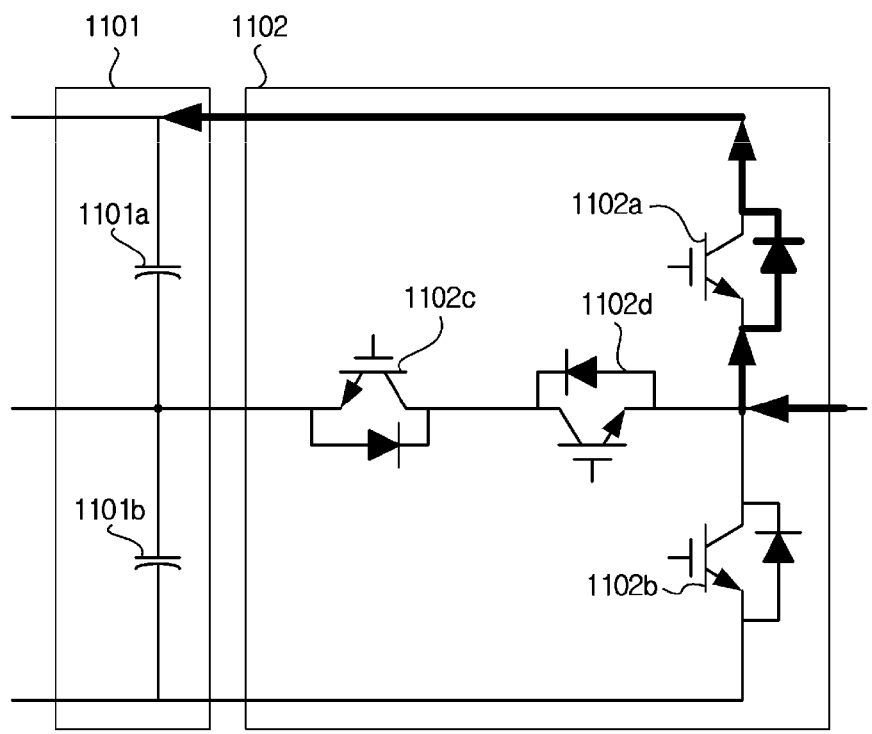
Figure 20:
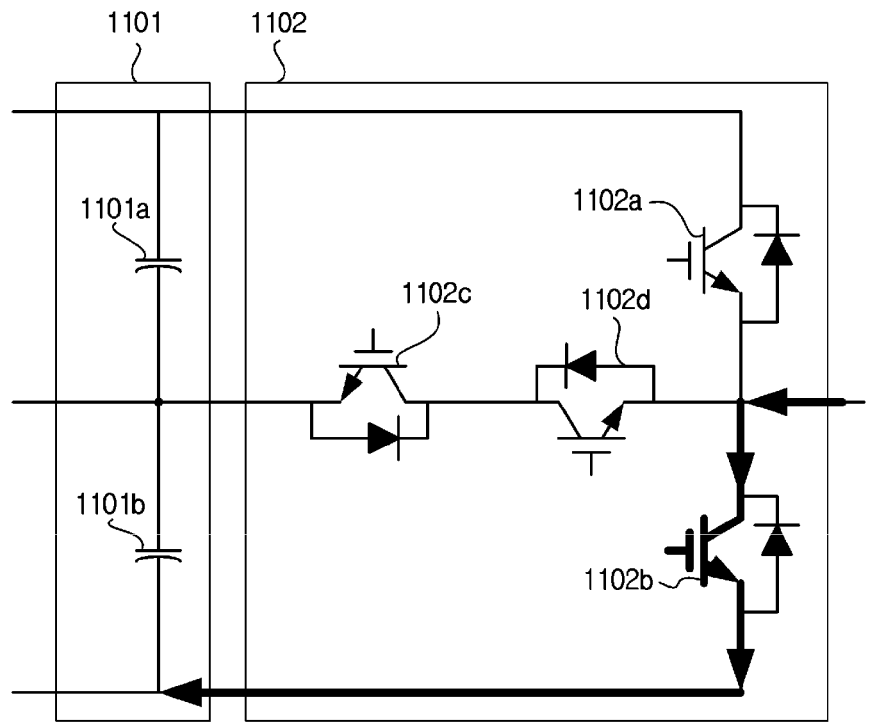

FIG. 18 illustrates a switch unit that is conductive when the output pole voltage is 0, and an output current is negative, FIG. 19 illustrates a switch unit that is conductive when the output pole voltage is E, and an output current is negative, and FIG. 20 illustrates a switch unit that is conductive when the output pole voltage is −E, and an output current is negative. One diode and one switch unit are conductive in FIG. 18, one diode is conductive in FIG. 19 and one switch unit is conductive in FIG. 20.

Furthermore, it can be noticed that, although one switch unit and one diode are conductive in FIGS. 15 and 18, only one diode and one switch unit are conductive in the remaining FIGS, and average number of conductive power semiconductors is reduced over that of FIGS. 5 to 10.

Because the number of the turned-on devices in operation is reduced when the multi-level inverter according to the present disclosure thus described is used, loss generated from the power semiconductor can be reduced, whereby efficiency of an entire system can be increased, and whereby sizes of heat dissipating elements for heat dissipation can be also reduced.

As noted from the foregoing, the new multilevel inverter according to the exemplary embodiments of the present disclosure that uses a new type of multilevel inverter can advantageously reduce the number of operatively used power semiconductors over the cascaded NPC inverter, and can reduce the conduction loss, whereby efficiency can be enhanced over the conventional multilevel inverter, and whereby the cost and size can be reduced. The abovementioned advantages can be accomplished by the reduced number of averagely conducted power semiconductors due to changes in inverter configuration, and the reduced conduction loss can be embodied by easing the heat dissipating design.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. A multilevel inverter, the multilevel inverter comprising:
a rectifier configured to provide a first rectifying voltage rectified by receiving a first three-phase voltage, a second rectifying voltage by receiving a second three-phase voltage, a third rectifying voltage by receiving a third three-phase voltage, and a fourth rectifying voltage by receiving a fourth three-phase voltage;
a smoothing unit configured to provide voltages of different levels to corresponding nodes of a first node, a second node, a third node, a fourth node, and a fifth node by receiving the first to fourth rectifying voltages rectified by the rectifier; and
an inverter unit comprising a plurality of switches configured to transmit voltages of three levels provided by the smoothing unit,
wherein the smoothing unit comprises a first capacitor configured to smooth the first rectifying voltage, a second capacitor configured to smooth the second rectifying voltage, a third capacitor configured to smooth the third rectifying voltage, and a fourth capacitor configured to smooth the fourth rectifying voltage, wherein the first to fourth capacitors are serially-connected;
wherein the plurality of switches comprises:
a first switch unit interposed between the first node and a first output terminal;
a second switch unit interposed between the third node and the first output terminal;
a third switch unit interposed between the fifth node and the first output terminal;
a fourth switch unit interposed between the first node and a second output terminal;
a fifth switch unit interposed between the third node and the second output terminal; and
a sixth switch unit interposed between the fifth node and the second output terminal;
wherein the first to third switch units are included in a first leg and the fourth to sixth switch units are included in a second leg, and an output voltage is synthesized using a potential difference between the first leg and the second leg.

2. The multilevel inverter of claim 1, wherein the first to sixth switch units each include a power semiconductor and a diode.

3. The multilevel inverter of claim 1, wherein the second switch unit comprises:
a first diode having a current directivity from the third node to the first output terminal;
a first power semiconductor having a current flow directivity reverse from that of the first diode;
a second diode having a current flow directivity reverse from that of the first diode and serially connected to the first diode; and
a second power semiconductor having a current flow directivity reverse from that of the first power semiconductor and connecting a first side of the second diode to a second side of the second diode.

4. The multilevel inverter of claim 1, wherein the first switch unit comprises:
a first diode having a current flow directivity from the first output terminal to the first node; and
a first power semiconductor having a current flow directivity reverse from that of the first diode and connecting a first side of the first diode to a second side of the first diode.

5. The multilevel inverter of claim 4, wherein the third switch unit comprises:
a second diode having a current flow directivity from the third node to the first output terminal; and
a second power semiconductor having a current flow directivity reverse from that of the second diode and connecting a first side of the second diode to a second side of the second diode.

6. The multilevel inverter of claim 1, wherein the fifth switch unit comprises:
a first diode having a current directivity from the second node to the second output terminal;
a first power semiconductor having a current flow directivity reverse from that of the first diode and connecting a first side of the first diode to a second side of the first diode;
a second diode having a current flow directivity reverse from that of the first diode and serially connected to the first diode; and
a second power semiconductor having a current flow directivity reverse from that of the first power semiconductor and connecting a first side of the second diode to a second side of the second diode.

7. The multilevel inverter of claim 1, wherein the fourth switch unit comprises:
a first diode having a current flow directivity from the second output terminal to the first node; and
a first power semiconductor having a current flow directivity reverse from that of the first diode and connecting a first side of the first diode to a second side of the first diode.

8. The multilevel inverter of claim 7, wherein the sixth switch unit comprises:
a second diode having a current flow directivity from the third node to the second output terminal; and
a second power semiconductor having a current flow directivity reverse from that of the second diode and connecting a first side of the second diode to a second side of the second diode.

9. The multilevel inverter of claim 1 further comprising a phase shifting transformer comprising a plurality of unit power cells and configured to provide a power signal having a predetermined phase to the plurality of unit power cells by receiving a 3-phase voltage.

* * * * *